April 29, 1958     J. D. RIESER     2,832,229
UNIMOUNT DRIVE GEARMOTOR UNITS AND MOUNTINGS THEREON
Filed Oct. 3, 1955     3 Sheets-Sheet 1
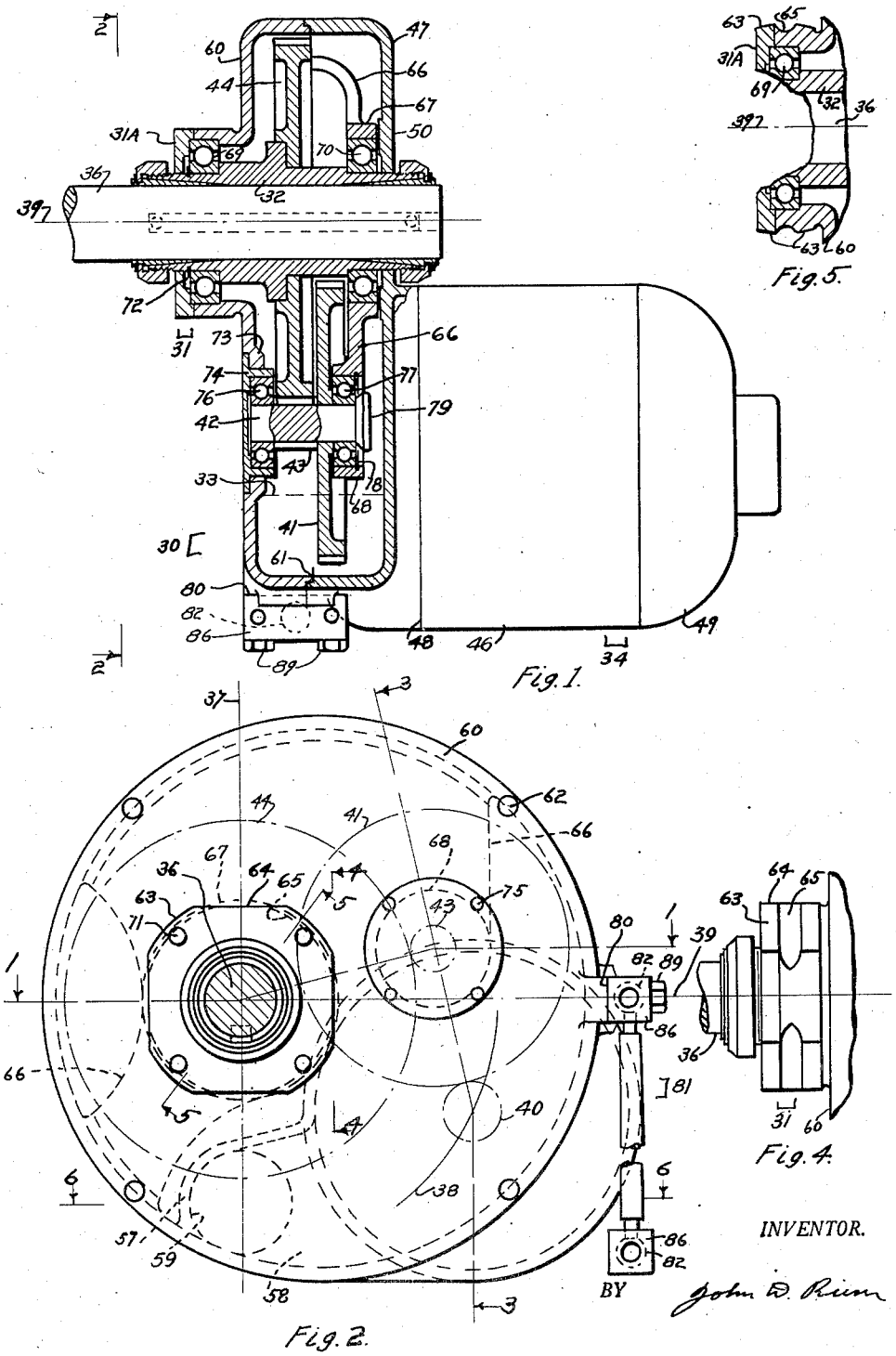
INVENTOR.
John D. Rieser
BY April 29, 1958 J. D. RIESER 2,832,229
UNIMOUNT DRIVE GEARMOTOR UNITS AND MOUNTINGS THEREON
Filed Oct. 3, 1955 3 Sheets-Sheet 2
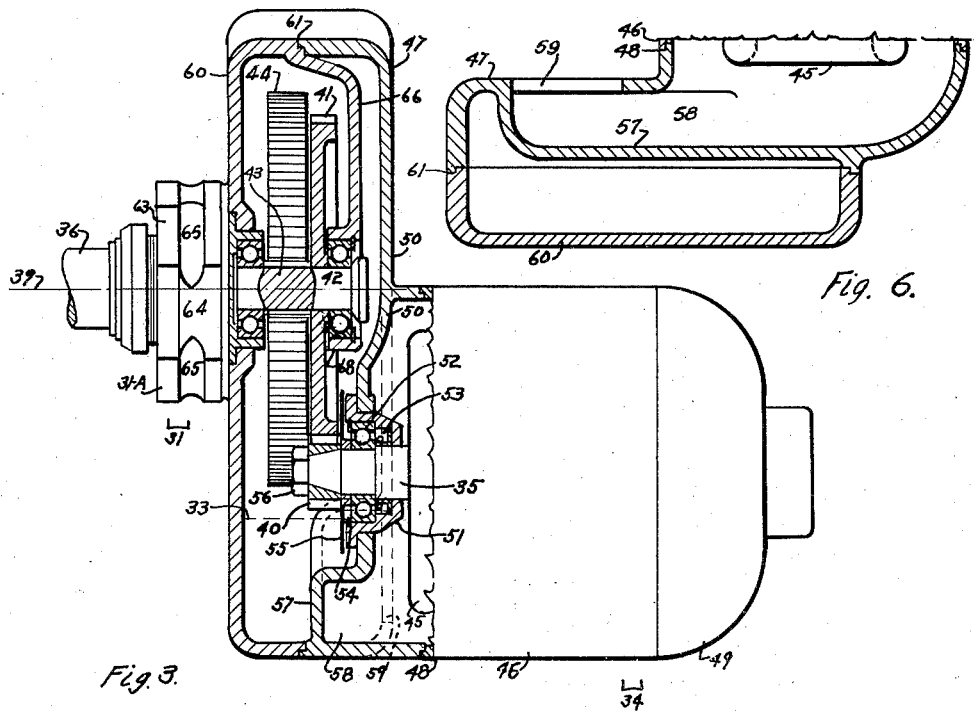
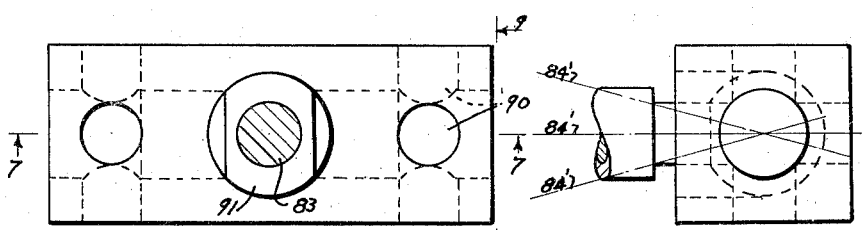
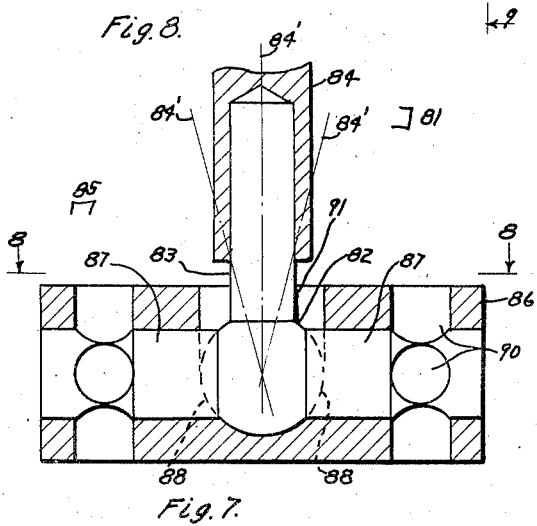
INVENTOR.
BY John D. Rieser April 29, 1958 J. D. RIESER 2,832,229
UNIMOUNT DRIVE GEARMOTOR UNITS AND MOUNTINGS THEREON
Filed Oct. 3, 1955 3 Sheets-Sheet 3
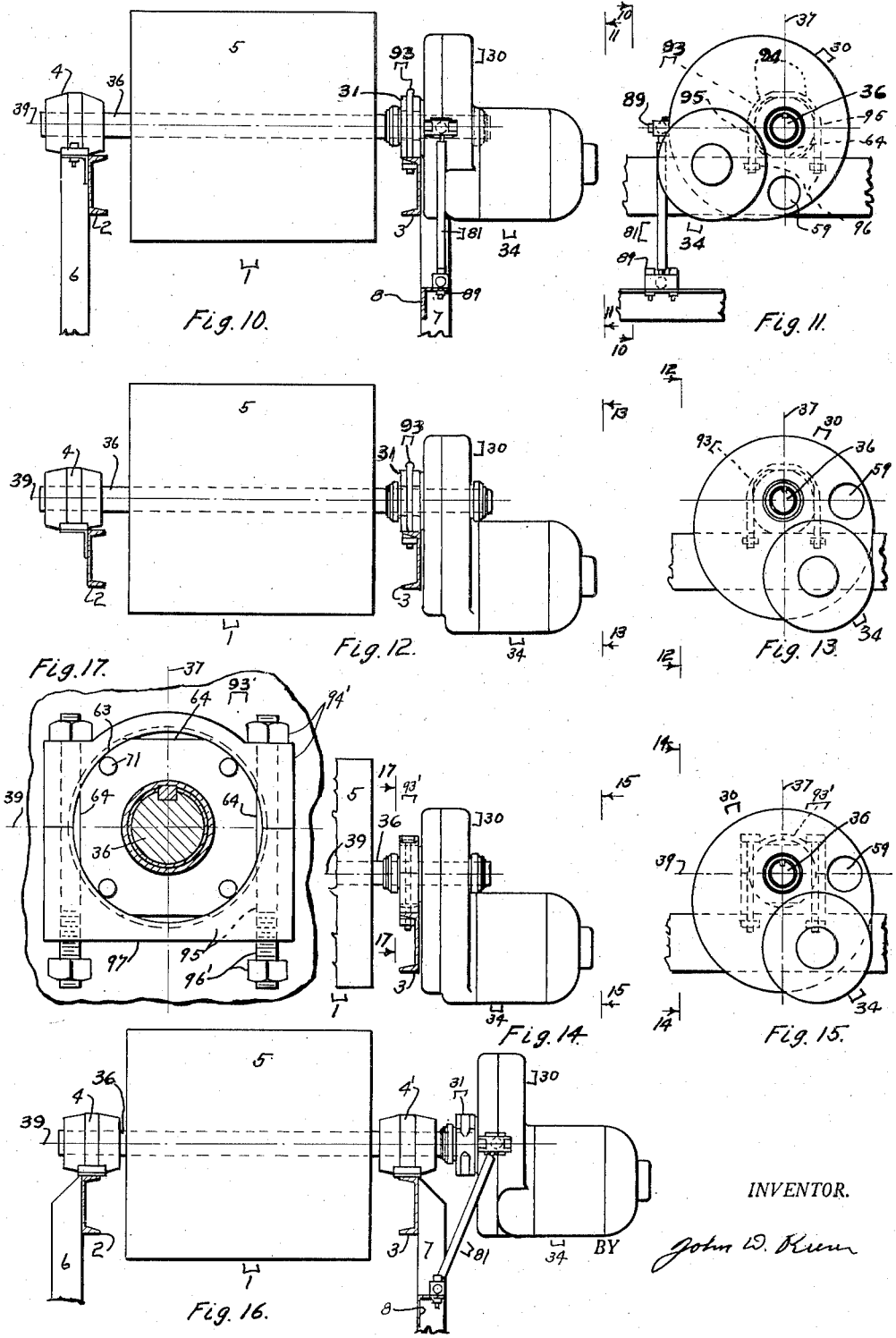
INVENTOR.
John D. Rieser

United States Patent Office 2,832,229
Patented Apr. 29, 1958

2,832,229

UNIMOUNT DRIVE GEARMOTOR UNITS AND MOUNTINGS THEREON

John D. Rieser, San Francisco, Calif.

Application October 3, 1955, Serial No. 537,925

7 Claims. (Cl. 74—421)

The present invention relates generally to motorized unimount drive speed change transmissions of the kind that mounts about the drive end portions of an apparatus or machine to be driven thereby. More particularly the invention concerns a mounting means that readily solves different types of installation problems.

Heretofore speed change transmissions, for example of the type disclosed in my Patent 2,603,983, dated July 22, 1952, included at the side of the casing, an extension having externally a spherical portion, about which extends a two piece support structure. And to prevent rotation of the unit, said support provides a pair of bosses with slotted holes, into which extends a pair of pins that in turn are supportably mounted onto the side of the casing. While thereof my Patent 2,640,367, dated June 2, 1953, included at the side of the casing, a round hub extension having a groove of semi-circular cross-section and about a portion of which may be extended an ordinary U-bolt, which in turn clamps said hub onto a stationary member of the machine being driven, and in which the clamping effect serves to prevent rotation of the unit. And referring to my application Serial No. 483,275, filed January 21, 1955, now issued as Patent Number 2,794,930, includes at the side of the casing an extension having externally a spherical portion that has a pair of slots, each of which has a side that is parallel to the axis of the power takeoff shaft of the unit. And about said spherical portion extends a two piece support. And to prevent rotation of the unit, a portion of a side of each of the bolts fastening together said two piece support, engages said parallel side of said slots. And when applying these units, their specific extension provides an individual method for operably installing the respective units in a prescribed manner, which renders difficult their application to accommodate a variety of different installation situations ordinarily encountered in practice.

It is a general broad object of the present invention to provide a boss or extension at the side of the casing of this type speed change transmission unit, having externally a surface of multiform cross section and characterized so as to readily permit of installing the unit in a variety of different ways, without having to change the boss or its external surface accordingly.

Another object of the present invention is to provide within the casing of this type speed change transmission unit characterized by having a fluid tight air duct that extends from a portion of the motor to an aperture in a side wall of the casing and so compact the overhang length of the unit.

Another object of the present invention is to provide within the casing of this type speed change transmission of the above mentioned character in which the interengaging surface between casing halves be disposed at a side of the intermediate gear toward the boss so as to readily permit of removal or placement of said intermediate gear in a radial direction without dismantling of the journal supports of the power takeoff shaft of the unit.

Another object of the present invention is to provide a motorized unimount drive speed change transmission of novel and simplified construction.

Other more specific objects and advantages will appear from the following description of the illustrative embodiment of the present invention.

In the drawings accompanying and forming a part hereof, Figure 1 is a side view of my unit, partly in section, taken on the line 1—1 Figure 2.

Figure 2 is an end view, viewing in the direction of the arrows 2—2 Figure 1.

Figure 3 is a side view, partly in section, taken on the line 3—3 Figure 2.

Figure 4 is a fragmentary plan view, viewing in the direction of the arrows 4—4 Figure 2, showing the external surface of multi-form cross section there on the boss which is at the side of the casing.

Figure 5 is a fragmentary side view, in section, taken on the line 5—5 Figure 2, showing the groove portions bi-secting the spherical portions on the boss which is at the side of the casing.

Figure 6 is a fragmentary plan view, partly in section, taken on the line 6—6 Figure 2, showing the fluid tight duct that extends through a fluid medium within the casing from a portion of the motor to an aperture in a wall of the casing and thus serving to communicate the interior of the motor with the atmosphere.

Figure 7 is an enlarged plan view, partly in section of the ball type end at ends of the arm.

Figure 8 is a plan view, partly in section, taken on the line 8—8 Figure 7.

Figure 9 is an end view, viewing in the direction of the arrows 9—9 Figure 8.

Figure 10 is a section, taken on the line 10—10 Figure 11, and shows the section through a conveyor structure at its drive end to illustrate an application of my motorized speed change transmission unit onto a driven machine, the application shows the boss at the side of the casing with one of its flat portions resting onto the top face of an ordinary conveyor stringer, which in this example is an ordinary structural channel. And externally about the boss show the coupling, which in this example, is of U bolt form, with its upper portions engaging portion of the groove portions on the boss, while its lower portions engage a portion of the flat portions also on the boss and to secure the unit in place onto the top flange of the channel, the coupling has its securing portions extending through holes in said top flange with its nuts tightened against the lower face of said top flange. This example, also shows an application of the arm, which has a socket at each of its ends, one being mounted onto the side of the casing, while the other mounts onto a stationary member of the machine. Thus serving to carry portion of the overhang weight, while the lower portions of the U bolt serves to prevent rotation of the unit.

Figure 11 is an end view, viewing in the direction of the arrows 11—11 Figure 10. The motor being to the left of the drive shaft of the conveyor and in which event, the vertical distance from the center of said shaft to the bottom of the casing is minimum. And by means of dotted lines, show the abutment of the lower portions of the U bolt against portion of the flat portions on the boss, with the securing portions extending through the top flange.

Figure 12 is a section, taken on the line 12—12 Figure 13 and is same as that of the Figure 10, with the following exceptions, this installation example, shows my unit with its motor vertically below that shown thereof the Figure 10 and 11 and the arm has been omitted entirely.

Figure 13 is an end view, viewing in the direction of the arrows 13—13 Figure 12 and it is readily seen that with respect to the center of the drive shaft of the machine being driven, the motor is located at a point ninety degrees from that shown thereof Figure 11.

Figure 14 is a fragmentary section, taken on the line 14—14 Figure 15 of the conveyor structure at its drive end, same as that of the Figure 12. However in this installation example, the U bolt coupling has been omitted and in place of same shows a modified type coupling and securing portions to effect an operative installation. This modified coupling and the securing portions provides a greater mounting flexibility and self-aligning features.

Figure 15 is an end view, viewing in the direction of the arrows 15—15 Figure 14, the modified coupling and securing means being shown by means of dotted lines.

Figure 16 is a section through a conveyor structure at its drive end. And in this installation example, my unit mounts onto an end portion of the drive shaft of the conveyor, while the arm as above has the socket at each of its ends, with one mounted onto the side of the casing, while the other mounts onto a stationary member of the machine. And in this example, serves a dual purpose, one being the prevention of rotation of the unit, the other being the supporting of a portion of the overhang weight.

Figure 17 is a fragmentary enlarged end view, partly in section taken on the line 17—17 Figure 14, showing the modified coupling and its securing portions.

In conformity with the objects of this invention, to provide a unimount drive gearmotor speed change transmission, hereinafter referred to as the unit, and referring particularly to the Figure 1, the unit generally consists of a fluid tight casing 30 having a boss 31, a power takeoff shaft 32 which in this illustration is tubular and fitted to couple it directly and rigidly about a portion of the drive shaft of an apparatus or machine to be driven thereby, and as its fittings are similar to that of my copending application No. 372,107, filed August 3, 1953, now issued as Patent Number 2,811,861 hereinafter further discription is omitted. Internally the casing 30 includes a fluid medium 33 and externally the casing mounts an electric motor or prime mover 34, which consists of an electric motor having desired electrical characteristics and a power output shaft 35, speed change mechanism connecting the output shaft and the power takeoff shaft, a portion of which extends into the fluid medium, and operably the fluid medium wetting the internal surfaces of the casing and rotating parts within the casing. And as shown Figures 1-5, 10-17, the unit is coupled about a portion of the drive shaft 36 of the driven apparatus. And referring to the Figure 2, the dot and dash line 37 may be read as a vertical center line, altho the prime mover may be positioned anywhere on the arc of a circle 38, scribed from the center of the power takeoff shaft. And the dot and dash circles represent the pitch circles of the speed change mechanism within the casing 30, while the dot and dash line 39 may be read correspondingly as a horizontal center line.

In the form shown Figures 1-3 the speed change mechanism includes a double reduction gear set, of which the high speed pinion 40 or first gear is mounted onto an end portion of the prime mover output shaft 35, and in mesh with the pinion 40 is an intermediate gear 41 mounted onto the intermediate speed shaft 42, this shaft 42 also mounts the slow speed intermediate pinion 43, that in turn is in mesh with the power takeoff gear 44, or final gear, that is mounted onto the power takeoff shaft 32. These gears and pinions having suitable driving connection therewith their respective shafts and generally the driving connections are not shown.

The prime mover 34 shown or electric motor, is of the round frame footless type and is of usual construction, therefore its structure is not here described. The output shaft 35 which is also the input shaft of the unit, suitably and drivingly mounts a rotor (not shown) and the stator and coils 45, of which only a fragmentary portion is shown, are fastened onto the frame 46 of the prime mover in usual manner. The front end of the frame 46 is fitted to and engages a corresponding fitting thereof the rear end casing half or second section 47 to form a weather tight connection between the two as at 48, and held in place by a series of screws (not shown). And the rear end bracket 49, which is an ordinary rear end bracket of the motor fits and engages onto the opposite end of the frame 46 in the usual manner, the fastenings are not shown. The rear end bracket 49 is suitably fitted and supportably mounts a regular bearing for the motor shaft 35 at its rear end, none of which are shown. The rear end casing half or section 47 which may also be read as constituting the front end bracket for the motor and has a wall 50 which is bored for supportably mounting the bearing adaptor 51 (best seen at the Figure 3) which is bored for the bearing 52 and the positive seal 53, also to permit of the motor shaft 35 passing therethrough. The snap ring 54 together with a shoulder therein the adaptor 51 fixes the location of the bearing 52. The adaptor 51 being fastened onto the wall 50, the fastenings are not shown. As hereinabove mentioned an end portion of the motor output shaft 35 mounts the first gear and it also mounts the inner race of the bearing 52 and the slinger 55 and they are all held in place by the nut 56. The connection between the adaptor 51 and the wall 50 being oil tight and together with the positive seal 53 and other portions of the structure prevent entrance of the fluid medium 33 entering into the interior portions of the prime mover 34. Referring to the Figures 2, 3 and 6, the wall 50 of the second section 47 below the intermediate gear 41 is offset as at 57, which provides the duct 58 that extends from a front portion of the motor to an aperture 59 in the wall 50, which communicates the interior of the motor with the atmosphere, best seen at the Figure 6. And as the different portions of this wall 50 present an oil tight partition, readily provides of the duct being fluid tight. The rear end bracket 49 and/or the frame 46 may have its regular aperture to provide suitable ventilation passages. None of which have been shown as matters pertaining to requirement concerning ventilation passages and forced air requirement are well known, therefore description concerning same are here omitted. However some electric motor manufacturers provide that air be drawn in from one end and discharged at the other, while other manufacturers provide for drawing in of air from both ends and discharging same about a portion of the frame. And so far as concerns the duct 58, the ventilating air may be caused to travel in either direction therethrough the duct. Also it is realized that the duct may extend straight through the casing, in which event, the aperture would be in a wall of the other casing half or first section.

Referring to the Figures 1, 3 and 6, the casing 30 is composed of two principal parts and coupled together so as to form a fluid tight inclosure for the desired speed change mechanism. One of these parts is the rear end section or second section 47 heretofore mentioned and the other part is the front end section 60 or first section. They are suitably fitted with corresponding faces as at 61 and fastened together with a series of screws or bolts 62 (see Figure 2) to form a single structure. The first section 60 has the boss 31 which includes the cap 31A. The boss 31 has certain inherent advantages over the prior art by having an external surface of multiform cross-section, (best seen at the Figures 2, 4 and 5) consisting of spherical portions 63, flat portions 64 and groove portions 65. And as illustrated, there are four spherical portions 63 that are in turn bi-sected by four groove portions 65 and the four flat portions extend normally parallel to the axis of the power takeoff shaft and length of the boss. And their utility and advantages will be hereinafter dwelt with. The first section 60 supportably mounts the hub element 66, which may be an integral portion of the first section as indicated, or it may be bolted thereto so as to form a single rigid structure. The element 66 includes the hub 67 and 68, also see the Figure 2, which by means of dotted lines indicate generally all the parts 66—68. Internally the boss 31 and the hub 67 are bored for the outer races of the bearings 69 and 70 (best seen at the Figure 1), that in turn form the journaling support for the power takeoff shaft 32. The bearing 69 being disposed between a face on the cap 31A, and a shoulder in the boss 31 so as to prevent endwise movement of the bearing 69, as the cap 31A, is fastened to the body portion of the boss 31, by the series of screws 71, see Figure 2. And the snap ring 72 and a shoulder on the power takeoff shaft correspondingly prevents endwise movement of the power takeoff shaft 32. And the second section 47 has an aperture so as to permit of an end portion of the power takeoff shaft extending therethrough, when same is desired. The first section 60 also has the hub 73 in line with the hub 68, the hub 73 is bored and faced for the adaptor 74, which is fastened thereto by the series of screws 75 (see Figure 2) and the adaptor 74 and the hub 68 are bored for the bearings 76 and 77, which form the journaling support for the intermediate shaft 42. The hub 68 is also machined for the snap ring 78, which prevents the intermediate shaft moving excessively toward the motor. And the nut 79 anchors the bearing and the intermediate gear 41 in axial direction on the intermediate shaft 42. Thus it is readily seen that both the intermediate pinion 43 and gear 41 are disposed intermediate of the bearings 76 and 77 and that the interengaging faces 61 occur at a side of the intermediate gear 41 toward the boss 31, which readily permits of placing or removing the intermediate gear 41 in radial direction, as will hereinafter be described. It is understood, altho not shown that the casing may be provided with the usual breather and fluid level fittings together with fluid filling plug.

The casing 30 also includes a pad 80 for mounting thereto of an end portion of the arm, generally indicated by the numeral 81. The arm 81 constitutes optional equipment and may be applied to resist rotation of the unit therewith operable rotation of the drive shaft 36 and additionally its application may serve to support portion of the overhang weight of the unit, as will hereinafter be dwelt with. The arm 81 has at each of its ends, see Figure 7, a ball type end 82, which has a shank 83 that is fastened to a rod 84 (the fastenings are not shown) and the ball type end 82 extends into a socket 85, which forms an adjustable seat for said ball end. The dot and dash lines 84' indicate the adjustability range in any direction of the rod at each socket. Each socket being composed of a base 86 and a pair of plugs 87 that fit into a corresponding hole in the base 86. One end of each plug having semi-spherical seat 88 that corresponds to the diameter of the ball end 82. And as indicated when the shanks of the bolts or screws 89 (see Figure 10) extend through any of the holes 90 serve to retain the position of said plugs within the base. And with these plugs being held in place they prevent withdrawal of the ball type end therefrom the base and they also provide seating surfaces for same along with a lower portion of the hole 91, which may also be of semi-spherical seat form. The hole 91 at its upper portion being of size relative to the diameter of the ball end 82 so as to permit of same passing therethrough prior to placing of the plugs. The external diameter of the plugs 87 may be provided with screw threads and screwed into the base which in this event be threaded to correspond or as another alternative, said plugs could be welded in place in the base after insertion of the ball type end 82. Each of the sockets 85 have two sets of holes for the bolts 89 so as to readily permit of same being anchored from either direction onto a desired structure, which may or may not be in alignment with that of the axis of the power takeoff shaft 32. For example, referring to the Figures 1–2 and 10 the axis of the screws 89 at one end of the arm are shown as extending at right angle to that of the axis 84' of the arm 81, while at the other end of the arm 81, see Figure 10, the axis of the screws 89 extend parallel to that of the axis 84'. And as the socket 85 provides adjustability, it is readily seen that the top face of the stationary member 8 could be at any angle relative to the horizontal axis 39, so in practice, the top face of the stationary member 8 for example, can be an unfinished structure which is of material advantage, as it lessens installation costs.

The Figure 10 shows an external side view of the unit Figure 1, to reduced size, and with its power takeoff shaft coupled directly and rigidly onto the drive shaft 36 of the driven apparatus, generally indicated by the numeral 1, which in this example, is the drive end of an ordinary belt conveyor. Of which 2 and 3 are common side stringer channels, and as shown the top flange of the channel 2 mounts the base of an ordinary journal 4, that journally supports one end portion of the drive shaft 36, onto which is mounted in suitable manner a conveyor head pulley 5. While the other end portion of the drive shaft 36 is supportably journaled by the power takeoff journals within the unit, that in turn is shown mounted onto the top flange of the channel 3, by one of the flat portions 64 of the boss 31 resting on said top flange, thus it may be readily read that the boss forms support for the unit. The vertical members 6 and 7 represent ordinary support structures for the stationary channel members 2 and 3. And the numeral 8 represent a probable stationary tie member of the support structure. The coupling generally indicated by the numeral 93 has upper portions 94 and lower portions 95 and securing portions 96, best seen at the Figures 11, 13 and 17. The coupling 93 shown thereof by the Figures 11 and 13 is of U bolt form, of which the upper portions engages portion of the groove portions 65, while portion of the lower portions 95 engages portion of flat portions 64 so as to prevent rotation of the unit upon operative rotation of the drive shaft 36 or operative actuation of the unit. And the securing portions 96 consists of the screw threads and nuts, which secure the boss 31 of the unit onto the stationary member 3 of the driven apparatus or the like. And thereof the Figure 17 have shown a modified type coupling generally indicated by the numeral 93', which has upper portions 94' and lower portions 95' and the securing portions 96'. In which the upper portion 94' engages portion of the spherical portions 63, while the lower portion 95' in reverse manner also engages portion of the spherical portions 63, while the upper portion of the securing portions 96' engages portion of the flat portions 64, while bolting together the upper and lower portions about the boss 31. The lower portion 95' has a base 97 which rests or sets onto a face of the stationary member or foundation and internally the upper and lower portions are bored spherical correspondingly to that of the diameter of the spherical portions 63 of the boss so as to permit of movement between the two, so as to permit of automatically compensating for any misalignment between the foundation face and the axis of the shaft 36, upon the base contacting the face of the foundation. And the securing portions here shown are in the form of studs, which extend through portions of the upper and lower portions 94' and 95', with screw thread connection between the lower portion and the studs and provided with nuts at their top ends so as to permit of bolting the two together. The bottom end of these securing portions extend beyond the base 97 are provided with nuts, which forms means securing the boss 31 of the unit onto the stationary member 3 of the driven apparatus or the like in same manner as heretofore mentioned concerning the coupling 93 shown thereof the Figures 11 and 13. Thus in either example, the coupling is of a form so as to engage at least two of the surfaces thereof the boss 31 upon operably mounting the unit. Also in either example, the coupling 93 or 93' readily permits of inserting of customary shims or the like to position the unit so as to align the drive shaft 36 as desired, even tho the alignment of the face of the foundation does not happen to correspond with that of the axis of the drive shaft or power takeoff shaft of the unit.

Referring to the Figures 10 and 11, the motor 34 as shown is to the left of the drive shaft 36 which produces a condition of unbalanced load. And to compensate for same, have shown the inclusion of the arm 81, which also may be considered as serving to prevent of rotation of the unit and thereby relieving the flat portions 64 and the coupling of such service or portion of such service, in the event that the stationary member or foundation 3 encountered in practice, were insufficient to accommodate the torque forces produced. And it is realized, altho not shown, the counterpoise mechanism disclosed thereof the aforementioned patent may be applied to compensate for the overhang weight of the unit.

The Figures 12 and 13 show an installation of the unit drivingly coupled onto a conveyor drive shaft similar to that shown by the Figures 10 and 11, with the exception that the arm 81 has been omitted and that the motor 34 is located below the drive shaft 36. This is readily permissible, as the flat portions 63 are spaced at ninety degree intervals, along with being coaxial about the axis of the power takeoff shaft. And the same condition applies with reference to the groove and spherical portions thereof the boss 31, which as hereinabove mentioned permits of the motor being positioned anywhere about a circle scribed from the center of the power takeoff shaft. And as the aperture 59 is a part of the casing, it also moves accordingly, without having to effect changes thereof the casing 30, to accommodate the position of said aperture or motor, other than were the unit installed out of doors, it may be desirable to provide the aperture with a deflector or elbow to prevent moisture entering the motor.

The Figures 14 and 15 show an installation of the unit, similar to that of the Figures 12 and 13 with the exception, that this example, shows an application of the modified coupling 93' in place of the coupling 93 shown thereof the installation example Figures 10 and 13. And as shown Figure 14, the foundation face is in alignment with the axis of the drive shaft 36, this is not a necessary requirement, for as heretofore mentioned said face may be in misalignment with that of said axis, as this modified coupling is self-aligning.

The Figure 16 shows a modified installation of the unit drivingly coupled onto a conveyor drive shaft. In this installation example, the conveyor drive shaft extends beyond its regular bearing 4, onto which is coupled the power takeoff shaft of the unit in regular manner, without effecting any change thereof the boss 31. And as the arm 81 extends at an angle, effects a thrust in direction so as to compensate for portion of the overhang weight as well as compensating for operative torque forces.

Thus it is shown that the present development provides means that readily solves different types of installation problems that are ordinarily encountered in practice, without having to provide a specific type boss at the side of the casing to solve each mounting problem individually. And the same advantages pertain to a unimount drive unit having sheave type drivingly connecting the motor and the speed change mechanism. Then in addition to the above, the development also provides that the duct communicating an interior of the motor with the atmosphere, extends through the casing and/or fluid medium therein, provides for compacting the unit in its lengthwise direction. This is made feasable, by providing that portions of said duct be disposed in the same plane as that of the intermediate gear 41, best seen at the Figure 3. And to facilitate change of said intermediate gear, the casing interengaging surfaces of the sections 47 and 60 occur at a side of the intermediate gear that is toward the boss 31. And referring to the Figures 1 and 3, more particularly Figure 1, in the manufacture of these units, the desired speed at the power takeoff shaft 34 is an unknown factor, however they are ordinarily assembled completely for testing purposes. And upon a unit being sold, the gearing used during the testing period may not permit of attaining of a desired speed at the power takeoff shaft, in which event, the casing 30 is opened by the removal of the screws 62, which exposes the pinion 40 and the intermediate gear 41, the pinion is readily changed in regular manner by removing the nut 56 which permits of removing said pinion and replacing it with the size required. While at the intermediate shaft 42, the screws 75 are removed along with the nut 79, whereupon said shaft 42 is caused to move axially in a direction horizontally toward the boss 31, such distance as to permit of withdrawing in radial direction said intermediate gear and replaced with desired size that corresponds with the replaced size pinion on the motor shaft, all the while the journaling support for the power takeoff shaft remain undisturbed.

Various changes may be made in the embodiment of the invention hereinabove specifically described without departing from or sacrificing the advantages of the invention as defined in the appended claims.

I claim:

1. A speed change transmission comprising, a prime mover and a speed change device operably coupled to form a speed change unit, said device having a casing and a power takeoff shaft extending therefrom, said takeoff shaft including means to couple it rigidly about a portion of a drive shaft of an apparatus to be driven, a boss at one side of said casing with said takeoff shaft journally supported therein while extending therethrough, externally said boss having surface means of multiform cross section, having a pair of surfaces separated by a grooved portion, said surfaces comprising spherical segments connected by plane portions and being substantially square in cross section, said plane portions extending normally parallel to the axis of said takeoff shaft, means coupling said boss to a stationary member of said apparatus so as to effect operative support of said unit, said coupling means being of a form so as to engage at least two of said surface means upon operative actuation of said unit while being supported on said members.

2. A speed change transmission comprising, an electric motor and a speed change device operably coupled to form a speed change unit, said device including a fluid tight casing with a power takeoff shaft extending therefrom, said takeoff shaft having means to couple it rigidly about a portion of a drive shaft of an apparatus to be driven, a fluid medium within said casing, a boss at one side of said casing with said takeoff shaft journally supported therein while extending therethrough, externally said boss having surface means of multiform cross section, having a pair of surfaces separated by a grooved portion, said surfaces comprising spherical segments connected by plane portions and being substantially square in cross section, said plane portions extend normally parallel to the axis of said takeoff shaft, a duct within said casing, said duct being fluid tight while extending through a portion of said fluid medium from an interior portion of said motor to an aperture in a wall of said casing so as to form an operable air passage for said motor.

3. A speed change transmission comprising, an electric motor and a speed change device operably coupled to form a speed change unit, said device including a fluid tight casing with a power takeoff shaft extending therefrom, said takeoff shaft having means to couple it rigidly about a portion of a drive shaft of an apparatus to be driven, a fluid medium within the casing, a duct within said casing, said duct being fluid tight while extending through a portion of said fluid medium from an interior portion of said motor to an aperture in a wall of said casing, a boss at a side of said casing with said takeoff shaft journally supported therein while it extends therethrough, externally said boss having surface means of multiform cross section having a pair of surfaces separated by a grooved portion, said surfaces comprising spherical segments connected by plane portions and being substantially square in cross section, said plane portions extend normally parallel to the axis of said takeoff shaft and length of said boss, means coupling said boss to a stationary member of said apparatus so as to effect operative support of said unit, said coupling means being of a form so as to engage at least two of said surface means upon operative actuation of said unit while being supported on said member and said duct together with said aperture communicates said interior with the atmosphere.

4. A speed change transmission comprising, an electric motor and a speed change device operably coupled to form a speed change unit, said device having a casing and a power takeoff shaft extending therefrom, said takeoff shaft shaft including means to couple it rigidly about a portion of a drive shaft of an apparatus to be driven, a boss at one side of said casing with said takeoff shaft journally supported therein while extending therethrough, externally said boss having surface means of multiform cross section, having a pair of surfaces separated by a grooved portion, said surfaces comprising spherical segments connected by plane portions and being substantially square in cross section, said plane portions extending normally parallel to the axis of said takeoff shaft, means coupling said boss to a stationary member of said apparatus so as to effect operative mounting for said unit and said portion of said drive shaft, said means coupling having upper and lower portions including an internal spherical portion corresponding to said pair of surfaces, securing means, said securing means extending through portions of said upper and lower portions so as to bolt them together about said boss while said internal spherical portion engages said pair of surfaces and simultaneously side portions of the securing means engages portion of said plane portions so as to prevent rotation of said unit relative to operative rotation of said shafts.

5. A speed change transmission comprising, an electric motor and a speed change device operably coupled to form a speed change unit, said device having a casing and a power takeoff shaft extending therefrom, said takeoff shaft including means to couple it rigidly about a portion of a drive shaft of an apparatus to be driven, a boss at one side of said casing with said takeoff shaft journally supported therein while extending therethrough, externally said boss having surface means of multiform cross section, having a pair of surfaces separated by a grooved portion, said surfaces comprising spherical segments connected by plane portions and being substantially square in cross section, said plane portions extending normally parallel to the axis of said takeoff shaft, means coupling said boss to a stationary member of said apparatus so as to effect operative support of said unit and said portion of said drive shaft, said means coupling having upper and lower portions engaging corresponding portions of said surfaces, said means coupling including securing means for securing said unit thereto said member for operably securing said unit on said member.

6. A speed change transmission comprising, an electric motor and a speed change device operably coupled to form a speed change unit, said device having a fluid tight casing and a power takeoff shaft extending therefrom, said takeoff shaft including means to couple it rigidly about an end portion of a drive shaft of an apparatus to be driven, said casing having a first and a second section with cooperating face means, said motor having an output shaft with an end extending into said casing while being supportably mounted on said second section, a first gear drivingly mounted on said end, a final gear within said casing drivingly mounted on said takeoff shaft, an intermediate gear and an intermediate pinion within said casing drivingly connectng said first gear and said final gear, a boss on an external side of said first section, internally said first section and said boss supportably mounting bearings for journal support for said takeoff shaft, said face means being disposed relative to an end of said intermediate gear at a side toward said boss so as to permit of removal of said intermediate gear in radial direction without dismantling of said journal support, externally said boss having surface means of multiform cross section, having a pair of surfaces separated by a grooved portion, said surfaces comprising spherical segments connected by plane portions and being substantially square in cross section, said plane portions extending normally parallel to the axis of said shafts, an arm, said arm having at each of its ends a ball type end, said casing mounting a first socket end, said socket end including seating means for engaging one of said rod ends while the other rod ends mounts into a second socket end that operably mounts onto a foundation.

7. A speed change transmission comprising, an electric motor and a speed change device operably coupled to form a speed change unit, said device having a fluid tight casing and a power takeoff shaft extending therefrom, said takeoff shaft including means to couple it rigidly about an end portion of a drive shaft of an apparatus to be driven, a fluid medium within said casing, said casing having a first and a second section with cooperating face means, said motor having an output shaft with an end extending into said casing while mounted on said second section, a first gear mounted on said end, a final gear within said casing mounted on said takeoff shaft, an intermediate gear and an intermediate pinion within said casing drivingly connecting said first gear and said final gear, a boss on an external side of said first section, internally said first section and said boss supportably mounting bearings for journal support for said takeoff shaft, said face means being disposed relative to an end of said intermediate gear at a side toward said boss so as to permit of removal of said intermediate gear in radial direction without dismantling of sad journal support, externally said boss having surface means of multiform cross section, having a pair of surfaces separated by a grooved portion, said sufaces comprising spherical segments connected by plane portions and being substantially square in cross section, said plane portions extending normally parallel to the axis of said shafts, a duct within said casing, and said duct being fluid tight while extending through a portion of said fluid medium from an interior portion of said motor to an aperture in a wall of said casing so as to communicate the interior of said motor with the atmosphere.

References Cited in the file of this patent
UNITED STATES PATENTS
2,603,983    Rieser _____ July 22, 1952